A. TOMASZAK.
TROLLEY WHEEL.
APPLICATION FILED OCT. 20, 1917.
1,300,303.
Patented Apr. 15, 1919.
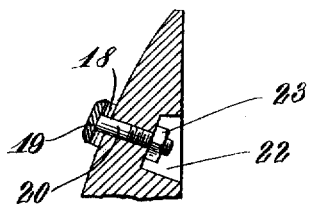
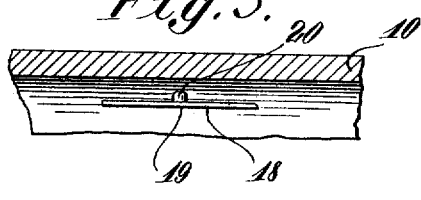
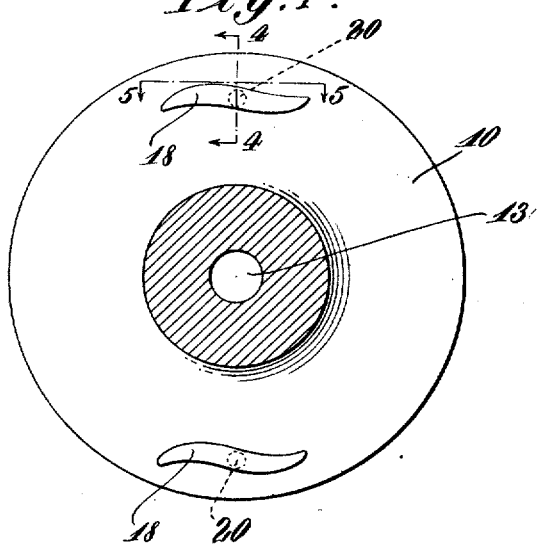
INVENTOR.
Antoni Tomaszak
BY
HIS ATTORNEY

UNITED STATES PATENT OFFICE.

ANTONI TOMASZAK, OF COHOES, NEW YORK, ASSIGNOR OF FORTY ONE-HUNDREDTHS TO JOZEF SKOWYRA, OF COHOES, NEW YORK.

TROLLEY-WHEEL.

1,300,303. Specification of Letters Patent. Patented Apr. 15, 1919.

Application filed October 20, 1917. Serial No. 197,556.

*To all whom it may concern:*

Be it known that I, ANTONI TOMASZAK, a citizen of Poland and a resident of Cohoes, county of Albany and State of New York, have invented certain new and useful Improvements in Trolley-Wheels, of which the following is a specification.

This invention relates to improvements in trolley harp wheels, as used in conducting current from an overhead wire to a vehicle moving along a trackway therebelow.

The principal object of the invention is to provide means so combined with the wheel or pulley as to prevent the pulley from being inadvertently separated from the wire under ordinary conditions.

This object is attained by the construction of parts shown in the accompanying drawing, forming a material part of this disclosure, and in which:—

Figure 1 is a sectional view, showing the preferred form of wire retainer.

Fig. 2 is an enlarged fragmental transverse sectional view taken on line 4—4 of Fig. 1, and Fig. 3 is another fragmental sectional view taken on line 5—5 of Fig. 1.

As shown in the drawing, to the trolley wheel 10 are secured peculiarly shaped resilient lugs 18, the same resembling an accent circumflex-shaped spring, the central part 19, of which extends outwardly into the groove 11, and has a stem 20, passing into an opening formed in the sides of the pulley, leading into the recess 22.

This recess contains an engaging nut 23, suited to the threaded end of the stem 20, and by means of which the spring lugs 18 are held to the groove of the pulley in such manner that they can be adjusted to or from the sides, rotated, or replaced when worn.

The manner of construction and operation of my improved trolley wheel is thought to be evident from the foregoing description and drawings.

Having thus described my invention what I claim as new and desire to secure by Letters Patent is:—

1. A trolley harp wheel, having an integral body and containing an annular recess receptive of a trolley wire, of a plurality of spaced arcuate spring elements secured in said body, said elements extending outwardly from the mentioned recess, a stem formed with said elements passing through the sides of the pulley and means for clamping said stems in an adjusted position thereto.

2. A trolley harp pulley, having an integral body, an annular recess formed centrally therein receptive of a trolley wire, a plurality of oppositely disposed, arcuately shaped elements arranged upon the inner faces of the mentioned recess, stems rigidly formed with said elements, said stems extending through openings formed in the sides of said body, and means for securing said elements tightly against the face of said recess.

In testimony whereof I have affixed my signature.

ANTONI TOMASZAK.

Copies of this patent may be obtained for five cents each, by addressing the "Commissioner of Patents, Washington, D. C."